United States Patent [19]
Bradbury et al.

[11] 3,811,627
[45] May 21, 1974

[54] APPARATUS FOR INTRODUCING CONTROLLED AMOUNTS OF PIGMENT INTO THERMOMECHANICALLY FORMED PLASTIC

[75] Inventors: William B. Bradbury, Coral Springs, Fla.; Anton J. Rothschmitt, Mountainside, N.J.

[73] Assignee: Plastic Molders Supply Co., Inc., Fanwood, N.J.

[22] Filed: July 31, 1972

[21] Appl. No.: 276,437

Related U.S. Application Data
[62] Division of Ser. No. 193,968, Oct. 29, 1971.

[52] U.S. Cl. .............................................. 241/281
[51] Int. Cl. ............................................ B02c 18/44
[58] Field of Search .................... 241/280, 281, 282

[56] References Cited
UNITED STATES PATENTS
| | | | |
|---|---|---|---|
| 524,748 | 8/1894 | Weber | 241/281 |
| 1,661,721 | 3/1928 | Gardner | 241/281 |
| 2,481,336 | 9/1949 | Orlando | 241/282 |

FOREIGN PATENTS OR APPLICATIONS
| | | | |
|---|---|---|---|
| 784,012 | 10/1957 | Great Britain | 241/280 |

*Primary Examiner*—Granville Y. Custer, Jr.
*Attorney, Agent, or Firm*—Fisher, Christen & Sabol

[57] ABSTRACT

A micrometer mixer is used to comminutize (shave) pigment bars and mix it with plastic pieces. The mixture is passed into a plastic articles forming machine. The micrometer mixer includes a rotary cutter against which a pigment bar is advanced at a controlled rate.

5 Claims, 8 Drawing Figures

PATENTED MAY 21 1974 3,811,627

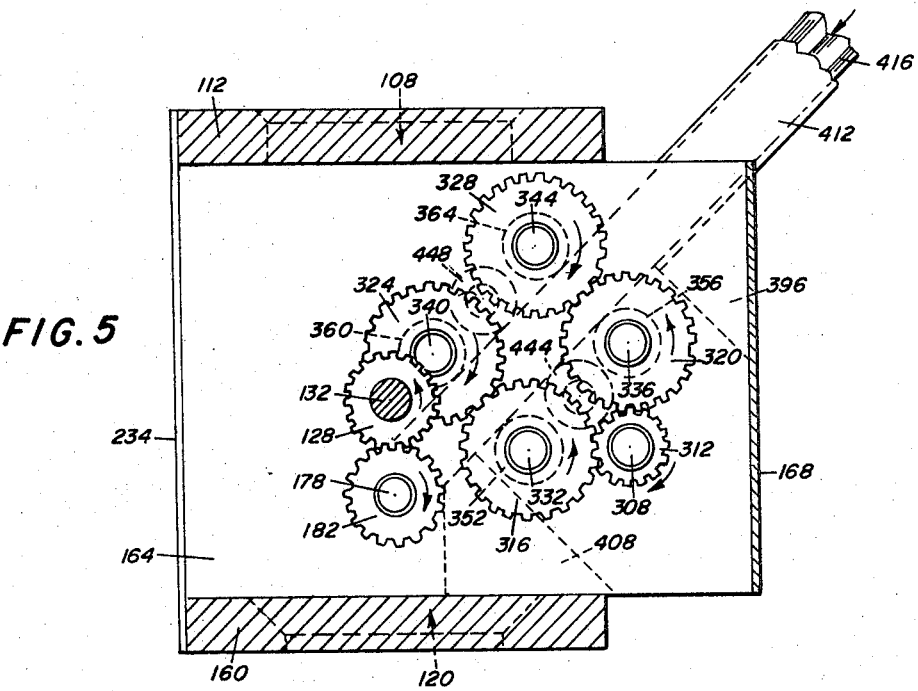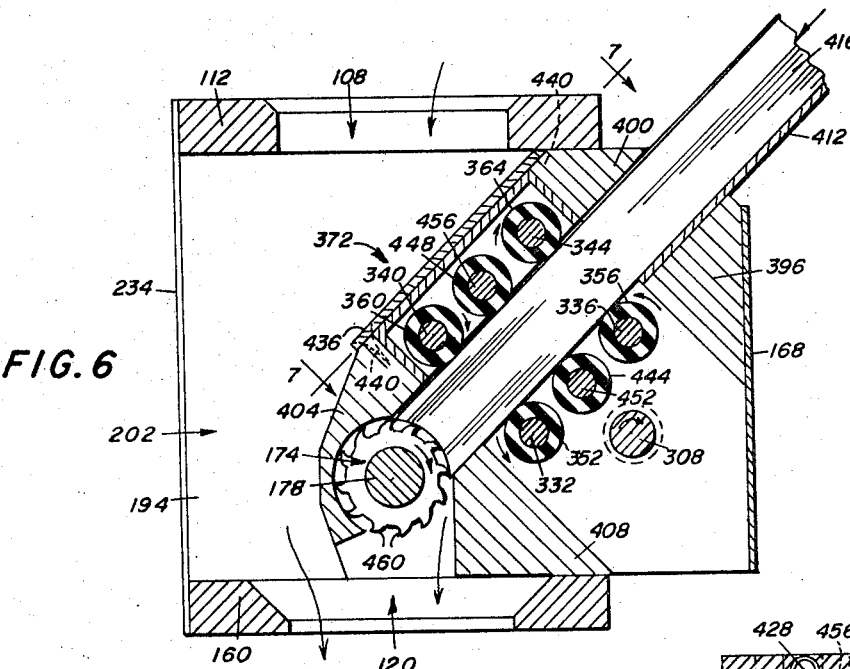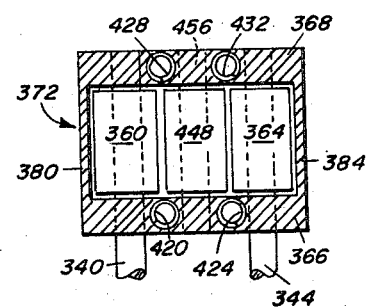

APPARATUS FOR INTRODUCING CONTROLLED AMOUNTS OF PIGMENT INTO THERMOMECHANICALLY FORMED PLASTIC

This is a division of application Ser. No. 193,968, filed Oct. 29, 1971.

BACKGROUND OF THIS INVENTION

1. Field of This Invention

This invention relates to an apparatus for the introduction of pigment into molded plastic articles and more particularily into thermomechanically formed plastic articles.

2. Prior Art

U.S. Pat. No. 3,530,754 teaches an apparatus of introducing pigment concentrate into thermomechanically formed plastic articles. The pigment concentrate is in the form of a long ribbon or strand which is formed from pigment and plastic. At least two pigment strands are fed into rotary cutter which continuously cuts off the end of each pigment strand to form substantially sized pigment chunks (slices). The pigment slices are stated to have a dimension between 0.001 inch and 0.008 inch. The cutting is achieved by means of a rotary cutting blade working in conjunction with an anvil (there are at least two anvils). The pigment strands are cut into slices. Also, the feed rate of the pigment is controlled by the speed of rotation of feed roller 15 which is operated by a variable speed notor. The amount of pigment cannot be measured by means of a time control which can be preset.

U.S. Pat. No. 2,739,647 discloses an apparatus for simultaneously granulating strips or multiple thermoplastic material for use in an injection molding machine. The ends of the multiple strips are granulated by means of rotating blades. The multiple strips are formed from a continuous sheet which is cut into strips which are of a width regulated b the distance between cutting disc 3 and 3'. Very fine grains can be formed, see col. 2, lines 26 to 28, only when cutting discs 3 and 3' are used which have a reduced thickness and a high speed motor is used with the rotary cutter. So it is seen that very fine grains can only be obtained when only very thin feed material is used as the feed material into the rotary cutter.

U.S. Pat. No. 3,529,777 discloses a process of granulating plastic sheets into chips, e.g., about ¼ inch wide. The sheet is passed through a pair of meshing cutters which cuts through the sheet so as to form chips. The sheet is not comminuted into a fine powder because the chips must always have one dimension which is equal to the thickness of the original sheet. Besides that is only a theoretic value which is not obtainable in practice. This patent, at col. 7, lines 36 to 38, speaks of obtaining chips which are about ¼ inch wide. This patent at col. 4, lines 63 to 66, also speaks of a sheet feed material which has a thickness of about 0.031 in. So it is seen that a powder material is not even contemplated as being obtainable by this patent. A perforated screen is disclosed which causes recirculation of chopped pieces in order to further reduce their size, but the holes in the screen cannot be much smaller than the size of the original chopped pieces or else the build up of material will back up to a point where the feed sheet cannot be fed into the multiple chopping blades and the chopped up material just compacts into a mass that results in no material passing through the screen holes and the rotating cutters merely spin without any material being recirculated therebetween. Also, the communuting is not achieved by directing the sheet directly into a rotating cutter.

U.S. Pat. No. 1,764,202 discloses a device for cutting continuous lengths of yarn, thread or filaments into short lengths by means of an apparatus which utilizes a stationary blade and a revolving blade. U.S. Pat. No. 2,143,252 discloses the use of a shearing device having a rotating blade and a stationary blade having a high natural frequency of oscillation. The shearing device is used to cut threads. U.S. Pat. No. 2,850,421 teaches cutting a long, synthetic, extruded fibers into short lengths by means of a rotating, sincle blade disc which achieves the cutting across (perpendicular to) the direction of travel of the long fibers. U.S. Pat. No. 3,350,971 teaches converting a sheet material into chips.

BROAD DESCRIPTION OF THIS INVENTION

This invention involves an apparatus for introducing a pigment into plastic in the manufacture of plastic articles. The apparatus includes a rotary cutting means for comminuting a pigment bar into fine shavings of the desired size. There is a feed means for feeding the end of the pigment bar at a controllable rate against said rotary cutting means. The means is capable of being preset to act as a time control which adjusts the amount of said pigment being used. Thus the pigment to plastic ratio can be controlled by adjusting the rate of plastic feed before or during operation, or by presetting the rate of comminuting the pigment bar into powdered pigment feed. There is also means for conveying the fine shavings of pigment into the intake of a plastic article molding machine. The finely comminuted (shaved) pigment is intermixed with pieces of plastic. The intermixture is molded or thermomechanically formed into a plastic article.

Preferably the means for conveying the comminuted (shaved) pigment is a means for intermixing the powdered pigment and the plastic pieces, and for conveying the intermixture to the intake of the plastic article molding machine, which is normally an extruder or screw injection molding machine.

This invention involves the novel features of milling, cutting, or scraping off pigment from a solid pigment bar to form fine shavings. This means that the comminuted (shaved) pigment can be uniformally mixed with the plastic pieces as they are fed into the plastic article forming machine.

An advantage of this invention is that the resultant comminuted (shaved) pigment and pieces of plastic are introduced directly, into the forming machine, at controlled rates. This further means that the ratio of pigment and plastic are easily controlled at any desired level.

An advantage of this invention is that the pigment bar is feed directly against the rotary cutting means which allows the pigment bar to be easily comminuted (shaved in an easy, controllable manner.

DETAILED DESCRIPTION OF THIS INVENTION

Within the scope of this invention, the pigment is formed in the shape of a bar, i.e., a piece of pigment which has a uniform cross-section along the length thereof and which is long in proportion to its width and thickness. The cross-section of the length of the pigment bar can have any shape but preferably is rectangular. The bar is preferably straight along its longitudinal axis, but can have any lengthwise shape, for example, the longitudinal axis can be curved. (Also this invention includes pieces of pigments having non-uniform cross-sections along the length thereof, which, for example, means that the pigment feed means contains floating pigment feed rollers). The pigment bar usually has a cross-section, along the length thereof, between 2-½ inches by 2-½ inches and ¼ inch by ¼ inch, and preferably 1 inch by ¼ inch. The pigment bar usually has a length which ranges between 2 inches and 18 inches. The casting method produces pigment bars which are normally 7 inches in length and have a uniform cross-section of 1 inch by 1-¼ inches. The extruder injection method produces pigment bars which are normally 3 inches in length and have a uniform cross-section of 1-¼ inches by 1-¼ inches.

The apparatus of this invention can be used to prepare and intermix fine comminuted (shaved) pigment with any plastic material, particularly that which may be thermomechanically formed into articles.

A preferred form of the apparatus according to this invention is illustrated in the drawings, wherein;

FIG. 5 is a cross-sectional view along lines 5—5 of the micrometer mixer shown in FIG. 2;

FIG. 6 is a cross-sectional view along lines 6—6 of the micrometer mixer shown in FIG. 2;

FIG. 7 is a cross-sectional view along lines 7—7 of the micrometer mixer shown in FIG. 6.

Figure 1:
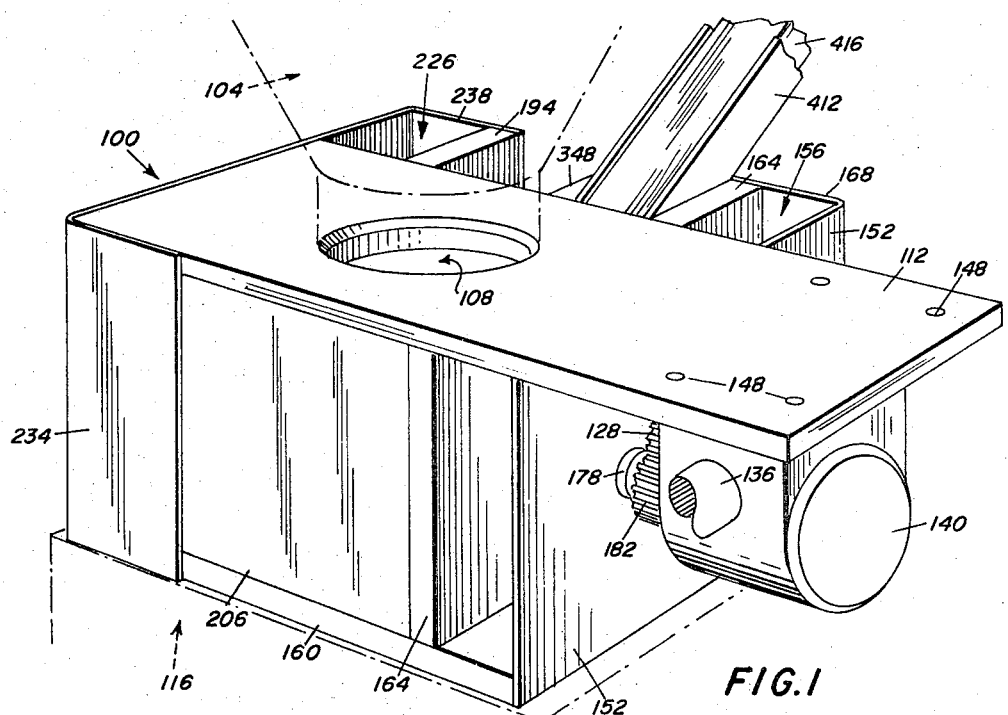
FIG. 1 is a perspective view of the apparatus (micrometer mixer) according to this invention for comminuting a pigment bar and intermixing it with pieces of plastic.

Color inducing apparatus or micrometer mixer 100 is shown in FIG. 1. A hopper (104) can be placed on top of micrometer mixer 100, the end of the hopper (104) being inserted into circular hole 108 which is located in top plate 112. The top edge of hole 108 should be outwardly tapered, as shown. Micrometer mixer can be mounted on the feed intake of extruder 116 so that circular hole 120 of micrometer mixer 100 lies overtop of the feed intake of extruder 116. The top edge of hole 120 should be outwardly tapered, as shown. As best seen in FIG. 6, granular plastic material from hopper 104 passes through hole 108, through the open center portion of micrometer mixer 100, through hole 120 and into the feed intake of extruder 116, mixing with the communited pigment (its source is explained below) which is also falling into the feed intake of extruder 116.

Drive motor 124 (see FIG. 4) causes the rotation of cutter drive gear 128 mounted on shaft 132 (see FIG. 2), via shaft 136 and reduction gear 140. Drive motor 124 is typically a ¼ horsepower motor (115–220 volts; single phase); and gear reducer 140 typically has a 5 to 1 ratio. Shaft 136 rotates in a counter-clockwise direction, as viewed from the gear reduction end. Reduction gear 140 is mounted on the bottom of top plate 112 (via screws or bolts 144 and holes 148) and outside of side wall 152. Cutter drive gear 128 is located inside of side wall 152 in gear chamber 156, shaft 132 passing through that wall. Gear chamber 156 is formed by a portion of bottom plate 160, inner side wall 164, a portion of back plate 168 and a portion of top plate 112. As seen in FIG. 1, the front wall of gear chamber 156 is open and since, as shown, top plate 112 does not completely cover the top of gear chamber 156, the back of its top portion is open (likewise with the corresponding bottom portion of gear chamber 156).

Cutter drive gear 128 drives cutter 174, which is mounted on shaft 178, by intermeshing with cutter gear 182, which also is mounted on shaft 178. Typically cutter drive gear 128 rotates at 350 rpm and cutter gear 182 rotates at 250 rpm, which means that cutter 174 would then rotate at 250 rpm (the preferred cutter rotation speed). Cutter 174 rotates in a clockwise direction, as viewed from the reduction gear end. Shaft 178 is rotably mounted near one end in ball bearings 186, that is mounted in inner side wall 164, and near the other end in ball bearings 190, that is mounted in inner side wall 194, Sleeve 198 is mounted on shaft 178 between inner side wall 194 and cutter 174. Cutter 174 is located in center chamber 202, through which the granular plastic falls. Center chamber 202 is formed, in part, by a portion of inner side wall 164, a portion of inner side wall 194, front wall 206, back wall 210, a portion of top plate 112 and a portion of bottom plate 160.

Gear 214, mounted on the end of shaft 178 away from reduction gear 140, intermeshes with gear 218 which is rotatably mounted on shaft 222 which is mounted in inner wall 194. Gear 214 is located in gear chamber 226.

Figure 4:
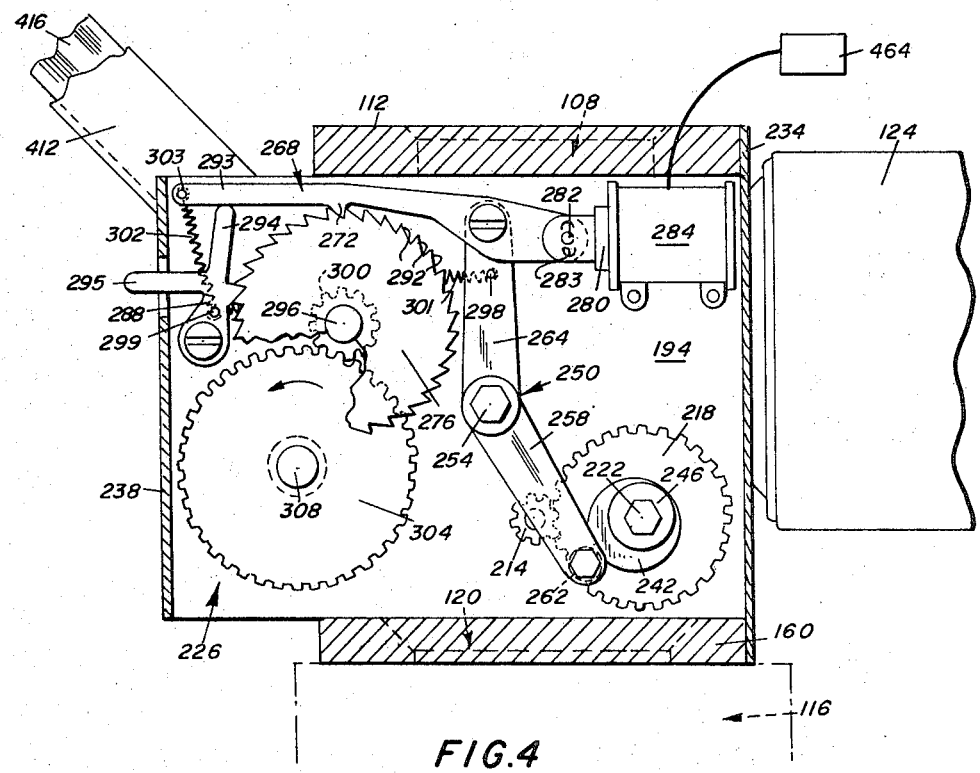
FIG. 4 is a cross-sectional view along lines 4—4 of the micrometer mixer shown in FIG. 2.

Gear chamber 226 is formed from part of top plate 112, part of bottom plate 160, inner side wall 194, side wall 230, front wall 234 and back wall 238. As seen in FIG. 1, top plate 112 does not completely cover the top of gear chamber 226 (likewise with the corresponding bottom surface of gear chamber 226). As shown in FIG. 4, cam 242 is located on shaft 222 beyond gear 218. Typically cam 242 has a one inch diameter, being circular, and its axis of rotation is ⅜ inch from its edge at the nearest point thereto. Plate 246 is located on shaft 222 beyond cam 242. The two arms (258 and 264) of pivot 250 form a wide V (vee). Pivot 250 pivots at the apex of the wide V and is pivotally mounted there on shaft 254, which is mounted in inner side wall 194. The outer end of lower arm 258 of pivot 250 contains rotably mounted cam follower 262.

The outer end of upper arm 264 of pivot 250 contains pivotally mounted ratchet arm 268. The left end (as looking into FIG. 4) of ratchet arm 268 contains ratchet hook 272 which meshes with ratchet gear 276. The right end of ratchet arm 268 contains pivotally mounted ram or plunger 280 by means of pin 282. Pin 282 fits through elongated hole 283 which allows a vertical movement of ratchet tooth 272. Plunger 280 is shown slidably mounted in solenoid 284, but the fit therein is usually not a tight one. Solenoid 284 is a conventional solenoid which has plunger 280 in the non-extended position when solenoid 284 is activated. This means, for example, that plunger 280 is magnetized or that, when plunger 280, is an iron bar, solenoid 284 has been accordingly wired. When solenoid 284 is not activated, plunger 280 is free to slide therein from the extended to the non-extended position and vice versa. At this point it should be noted that when solenoid 284 is activated, there is a gap, usually at least 1/32nd of an inch, between cam follower 262 and any part of rotating cam 242. Cutter 174, and hence cam 242, are allowed to continuously rotate at all times. Pivotally mounted ratchet stop 288 prevents ratchet gear 276 from turning in the wrong direction. As seen facing FIG. 4, gear 214 rotates counter clockwise, gear 218 rotates clockwise, and ratchet gear 276 rotates clockwise. One complete revolution of cam 242 is needed to advance ratchet gear 276 the distance of the width between two of its teeth (292).

Horizontal extension 293 extends beyond ratchet hook 272. As seen in FIG. 4, the end of the vertical extension arm 294 of ratchet stop 288 contacts the underside of horizontal extension arm 293 when ratchet hook 272 is in a tooth engagement position. Vertical extension arm 294 is positioned a few degrees inwardly when ratchet stop 288 is in a tooth engagement position. Horizontal extension arm 295 of ratchet stop 288 extends through wall 238. By depressing horizontal extension arm 295, ratchet stop 288 is placed in a tooth disengagement position and arm 293 is raised so that ratchet tooth 272 is placed in a tooth disengagement position. This allows ratchet gear 276 to be rotated in a clockwise direction by means of a knob (not shown) — the result being that pigment bar 416 is backed out of chute 412.

¾ inch below the pivot point of ratchet arm 268 on upper arm 264 of pivot 250, spring post 298 is located on the inside thereof. About ⅝ inch above the pivot point of ratchet stop 288, spring post 299 is located on the inside thereof. Spring 301 is connected between spring post 298 and spring post 299. When solenoid 284 is not activated, spring 301 holds cam follower 262 against cam 242. This means that ratchet tooth 272 is lifted up out of the one slot of ratchet gear 276 and back over the following slot. Gravity is sufficient to engage ratchet tooth 272 with the next slot of ratchet gear 276. Slot 283 allows such movement. Spring 302, connected between spring post 299 and spring post 303 on horizontal extension arm 293, also forces ratchet tooth 272 into that next slot of ratchet gear 276.

As cam 242 continues to rotate, ratchet tooth 272 is pulled forward so as to turn ratchet gear 276. One revolution of cam 242 turns ratchet gear 276 the distance between two teeth of ratchet gear 276. Normally cam 242 rotates once per second so that ratchet gear is advanced that distance each second.

Ratchet gear 276 is mounted on shaft 296 which is rotably mounted in inner wall 194. Gear 300 is also mounted on shaft 296 and rotably engages gear 304. Gear 304 is mounted on roller drive shaft 308, which is rotably mounted in inner wall 164 and inner wall 168. Looking into FIG. 4, gear 304 and roller drive shaft 308 rotate in a counter clockwise direction.

Referring to FIG. 5, roller drive gear 312 is mounted on roller drive shaft 308. Roller drive 312 engages lower gear 316 and lower gear 320. Lower gear 316 engages upper gear 324, and lower gear 320 engages upper gear 328. Looking into FIG. 5, roller drive gear 312 rotates in a clockwise direction, lower gears 316 and 320 each rotate in a counter clockwise direction, and upper gears 324 and 328 rotate in a clockwise direction. Lower gears 316 and 320 are mounted on shafts 332 and 336, respectively; and upper gears 324 and 328 are mounted on shafts 340 and 344, respectively. Shafts 332 and 336 are rotatably mounted in inner wall 164 and wall 348 (best seen in FIG. 2). Lower rollers 352 and 356 are mounted on shafts 332 and 336, respectively.

Figure 2:
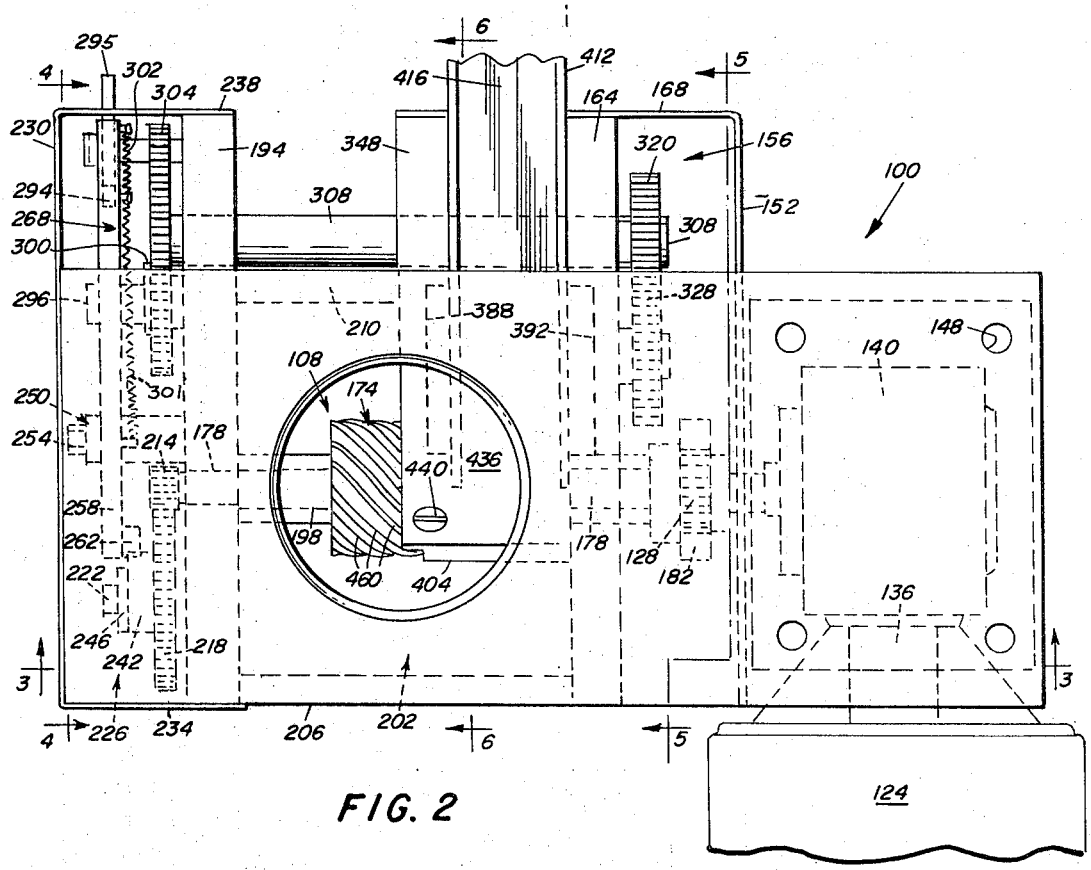
FIG. 2 is a top view, partially cut away of the micrometer mixer according to this invention.

Shafts 340 and 344 are rotably mounted in sides 366 and 368 of box 372 (best seen in FIG. 7). Upper rollers 360 and 364 are mounted on shafts 340 and 344. Box 372 is further comprised of top 376 and ends 380 and 384. Box 372 is open on its bottom side and upper rollers 360 and 364 extend slightly below the lower edges of box 372. The lower edge of side 368 of box 372 sits on ledge 388 of wall 348. Ledge 388 is the lower end of a rectangular slot cut in wall 348. The lower edge of side 366 of box 372 sits on ledge 392 of inner wall 164. Ledge 392 is the lower end of a rectangular slot cut out of that portion of inner wall 164 so that box 372 can easily fit therein. Ledges 388 and 392 are shown in FIG. 2 and ledge 388 is shown in FIG. 6. Shafts 340 and 344 are also usually rotably mounted in inner wall 164 so as to provide stability for gears 324 and 328 because, as explained below, box 372 is mounted so as to slightly "float".

Wall 348 contains large cross portions 396, 400, 404 and 408 (can be removable) which extend over to and are mounted on inner wall 164. Cross portions 396 and 400 serves as a mount for pigment bar chute 412, which is open on top. Pigment bar 416 is inserted into chute 412 and advanced by driven rollers 352, 356, 360 and 364 at a given rate against rotary cutter 174. The rate of advancement of pigment bar 416 is preferably 1/5000 of an inch per rotation of rotary cutter 174. Rotary 174 comminutes (shaves) the end portion of pigment bar 416 as it advances. Cross portion 408 is inwardly shaped so that it does not interfer with the pigment shavings falling through opening 120. Cross portion 404 serves as a cover for rotary cutter 174 so that the falling plastic pieces do not interfer with its operation.

A plane through the axis of shafts 332 and 336 is parallel to a plane through the axis of shaft 340 and 344. Both of those planes are preferably on about a 45° angle to the horizontal, although other angles can readily be used.

Cross portions 400 and 404, along with wall 348 and inner wall 164, serve as a compartment for box 372, as best seen in FIG. 6. Springs fit into holes 420, 424, 428 and 432 in box 372 (as seen in FIG. 7). Plate 436 fits over the top of box 372, holding those springs in place. Those springs apply a slight tension to rollers 360 and 364 as pigment bar 416 is advanced. Plate 436 is held in place by screws 440.

Idlers 444 and 448, usually made of rubber are mounted on shafts 452 and 456, respectively. Shaft 452 is rotably mounted in inner wall 164 and wall 348. Shaft 456 is rotably mounted in walls 366 and 368 of box 372.

Rollers 352, 356, 360 and 364 are preferably constructed of rubber, but can be constructed of any suitable material.

Figure 3:
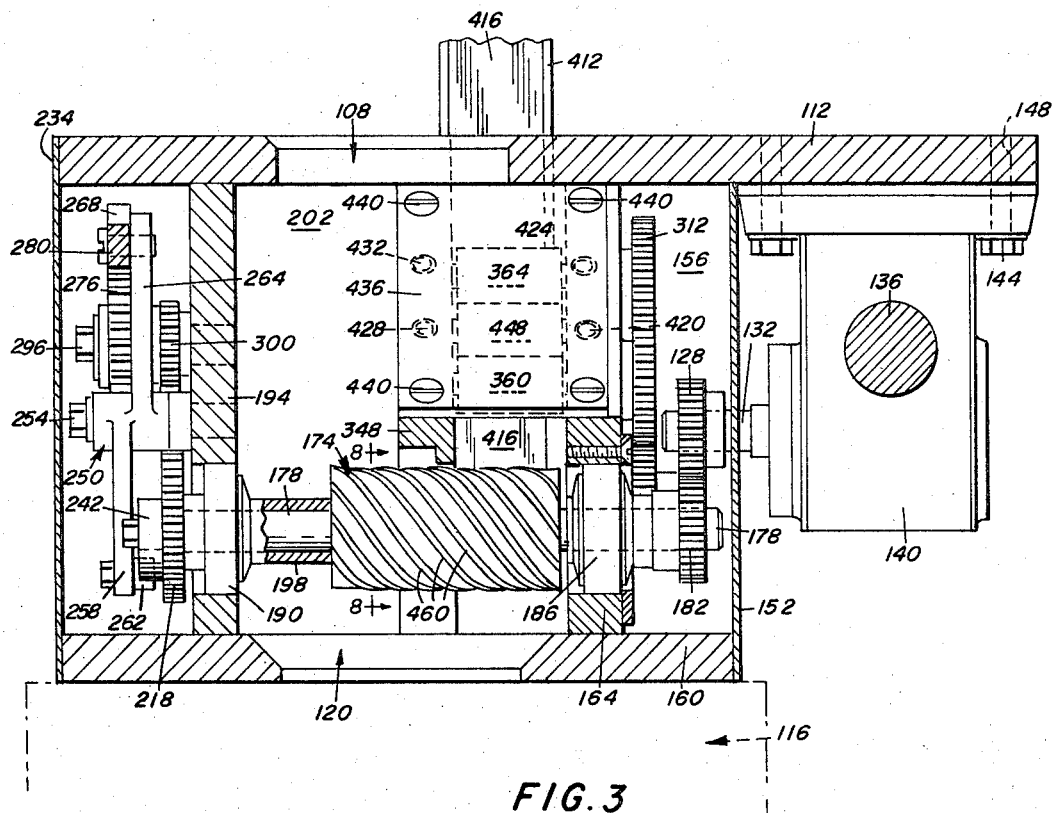
FIG. 3 is a cross-sectional view along lines 3—3 of the micrometer mixer shown in FIG. 2.
Figure 8:
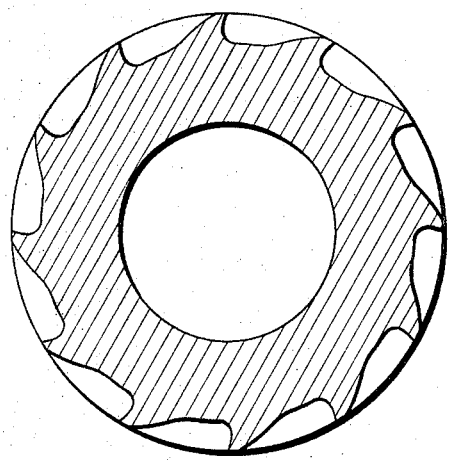
FIG. 8 is an enlarged view of the cross-section of cutter 174 shown in FIG. 6.

The rotary cutting means can have any configuration which will achieve the comminuting (shavings) of the pigment bar. Preferably rotary cutter 174 contains a series of blades 460 which are arranged helically around its rotation axis (see FIG. 3). A cross-sectional view of blades 460 is seen in FIG. 6. Each blade 460 is generally shaped so that the tip of it is greatly inclined in the direction of rotation, and the immediate trailing portion (about 10 to 50 thousandths of in inch) is flat (or slightly arched), the flat portion being tangent to a circle formed by the tips of the rotary cutter, but actually being inside of such circle. The preferred rotary cutter is best by the enlarged cross-sectional view of FIG. 8.

Preferably rotary cutter 174 is a spiral cutter having 12 teeth that operates with a rake action. Typically the spiral cutter has a length of 3 inches and outside diameter of 1.5 inch.

The rotary cutting device of this invention can have shape, design or size. For example, the rotary cutting device can be a central rotating core which have several lateral vanes mounted thereon, the ends of which are sharpened on the leading edge so as to finely particulate the pigment bar.

The pigment bar should be cut or particulated into fine shavings (pieces or particles) of pigment which are of a powder dimension. The pigment shavings usually has a mean particle size of about 0.1 and about 100 microns, preferably between about 0.2 and about 50 microns. The most preferred mean particle size for organic pigments is about 0.2 microns for organic pigments. The most preferred particle size for inorganic microns is about 50 microns. This invention will produce pigment shavings in the above range of mean particle size. The above mean particle size range for the pigment shavings is generally only to be used as a guide for the size of the pigment shavings.

As shown in the drawings, rotary cutter 174 extends out into the open cutter portion of micrometer mixer 100, but does not have to. When it does so extend, rotary cutter 174 helps to mix up the plastic pieces and pigment powder by churning up the plastic pieces as they fall through the open center portion and hit rotating rotary cutter 174.

As seen in FIG. 6, rotary cutter 174 removes pigment from pigment bar 416 in an arc (cross-sectiona) pattern. This has the advantage of allowing finer particles to be formed by the long distance over which teeth 460 of rotary cutter 174 are in contact with pigment bar 416.

The operation of micrometer mixer 100 starts by turning on the power to motor 124 and (activating) solenoid 284. Cutter 174 and cam 242 begin to rotate and remain in until the power is cut off. Timer 464, which has been preset to a specific time, say, 9 seconds, is activated when the ram in the extruder (not shown), in the pre-ramming position, contacts a microswitch (not shown). That microswitch is mounted so that it is contacted by the ram at the end of each cycle of the molding process. Timer 464 will allow th pigment cutting operation to continue until the preset time has expired. An ordinary timer will not operate again until it is then re-set, but timers which automatically re-set themselves are known and preferred. The length of the timer operation depends on how much pigment is to be used and the time in the molding operation before the ram again starts its operation of molding the pigmented plastic. When the timer is activated, the solenoid is deactivated, which allows pigment bar 416 to then be advanced into the rotating cutter 174. Essentially no pigment is comminuted off of pigment bar 416 by rotating cutter 174 until the rollers advance pigment bar 416 against rotating cutter 174. As timer 464 stops, solenoid 264 is activated. This causes cam follower 262 to disengage cam 242 until timer 464 allows another pigment cutting cycle to start. Timer 464 usually contains a relay and a microswitch, and normally can be set for a cutting operation from one to 60 seconds. When a pigment rod containing 70 percent of pigment is used, a cutting operation of 9 seconds is normally used. A cutting operating of 5 seconds usually results in a product which does not contain enough pigment. The operating cycle of the timer can be varied if the proper type of timer is used.

Timer 464 is preferably mounted on a plate (not shown), which is located on the back of micrometer mixer 100 and which has the dimensions of 6½ in. × 3½ in. × ¼ in. The microswitch in the timer is used to activate the solenoid at the end of the timer's operation cycle.

Chute 412 can be modified so that a pigment bar 416 can be automatically fed into chute 412 as the one therein is being used or is exhausted.

Presetting, as used herein, refers to the changing of gear ratios, etc., so as to preset the speed of rotation of rotary cutter 174 and/or the advancement rate of pigment bar 416 against rotary cutter 174. This allows for a time control or rate control of pigment being used — in otherwords adjustment, control and presetting are available in this invention. The rate of feed or amount of feed of the pigment can be varied by varying the speed to a motor (e.g., a variable speed motor), by using pigment bars having different cross sections, by changing the length of the timer operation cycle, by changing gear ratio, etc.

The term molding includes casting, thermomechanically forming, etc.

What is claimed is:

1. Apparatus for introducing a pigment into plastic which includes:
   a. a passageway through said apparatus through which pieces of plastic travel;
   b. rotary cutting means for comminuting a pigment bar into fine shavings, said rotary cutting means being located in said passageway (a) and said rotary cutting means causing said fine shavings to be scattered in said passageway (a) by means of the rotary action of said rotary cutting means;
   c. drive means for rotating said rotary cutting means, said drive means being adjustable so that the rotation speed of said rotary cutting means is adjustable and said drive means acting as a control of the rate of comminuting of said pigment bar;
   d. feed means for feeding one end of said pigment bar at a controllable rate against said rotary cutting means, said feed means being positivly driven by said drive means by positive interconnection with said rotary cutting means whereby said feed means is adjustable in the control of the rate of comminuation of said pigment; and
   e. timer means whereby the positive interconnection of said drive means with said rotary cutting means and said drive means can be engaged and disengaged on a timed interval basis which results in an adjustable time control of the amount of said pigment bar being comminuted; whereby said comminuted pigment and said pieces of plastic are intermixed.

2. Apparatus as described in claim 1 wherein said timer means includes a solenoid that is deactivated when the time means is in an operational cycle, said solenoid disengaging interruption means for interrupting said positive interconnection of said feed means and said rotary cutting means when said solenoid is deactivated and said solenoid engaging said interruption means when said solenoid is activated.

3. Apparatus as described in claim 2 wherein said positive interconnection between said feed means and said rotary cutting means includes ratchet means interconnecting gears interconnected with said feed means and gears interconnected with said rotary cutting means.

4. Apparatus as described in claim 1 wherein said rotary cutter contains a series of blades which are arranged helically around the rotation axis of said rotary cutter, each blade of said rotary cutter being shaped so that the leading tip of said each blade is greatly inclined in the direction of rotation of said rotary cutter and so that the immediate trailing portion is substantially flat, said substantially flat portion lying on a line that is tangent to a circle formed by the tips of the said blades of said rotary cutter and being inside of said circle.

5. An apparatus as described in claim 1 wherein said rotary cutting means (b) extends into said passageway (a), said pieces of plastic thereby being churned up and more thoroughly intermixed with said fine shavings of said pigment bar.

* * * * *